(12) United States Patent
Amann et al.

(10) Patent No.: US 8,996,770 B2
(45) Date of Patent: *Mar. 31, 2015

(54) INTEGRATED LINK CALIBRATION AND MULTI-PROCESSOR TOPOLOGY DISCOVERY

(75) Inventors: Eberhard Amann, Rottenburg (DE); Frank Haverkamp, Tuebingen (DE); Jan Kunigk, Nufringen (DE); Thomas Huth, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 13/592,406

(22) Filed: Aug. 23, 2012

(65) Prior Publication Data
US 2013/0060978 A1   Mar. 7, 2013

Related U.S. Application Data

(63) Continuation of application No. 13/226,360, filed on Sep. 6, 2011.

(51) Int. Cl.
G06F 13/00     (2006.01)

(52) U.S. Cl.
CPC .................................. *G06F 13/00* (2013.01)
USPC .......................................... 710/104; 713/1

(58) Field of Classification Search
CPC ............................ G06F 9/4401; G06F 9/4405
USPC .............................................. 710/104; 713/1
See application file for complete search history.

(56) References Cited

U.S. PATENT DOCUMENTS

| 6,760,838 | B2 |   | 7/2004  | Owen et al.          |         |
|-----------|----|---|---------|----------------------|---------|
| 7,600,109 | B2 |   | 10/2009 | Ueltschey, III et al.|         |
| 7,661,006 | B2 |   | 2/2010  | Abou-Emara et al.    |         |
| 7,856,551 | B2 | * | 12/2010 | Cai et al.           | 713/1   |
| 7,898,544 | B2 | * | 3/2011  | Johnson              | 345/502 |
| 8,307,198 | B2 | * | 11/2012 | Housty               | 713/1   |
| 8,499,141 | B2 | * | 7/2013  | Swanson et al.       | 713/1   |

(Continued)

FOREIGN PATENT DOCUMENTS

CN   101833537   9/2010

OTHER PUBLICATIONS

Hung, Austin et al., "Symmetric Multiprocessing on Programmable Chips Made Easy", Proceedings of the Design, Automation and Test in Europe Conference and Exhibition, vol. 1 2005, 6 pages.

(Continued)

*Primary Examiner* — Brian Misiura
(74) *Attorney, Agent, or Firm* — DeLizio Gilliam, PLLC

(57) ABSTRACT

Integrating link calibration and dynamic topology discovery in a multi-processor system establishes a first of a plurality of processors in the multi-processor system as a director of integrated link calibration and dynamic topology discovery. A plurality of high speed interconnects connects the plurality of processors with each other. The director processor directs calibration of each of the plurality of high speed interconnects via a shared hardware resource. The shared hardware resource is shared among the plurality of processors. Topology of the multi-processor system is incrementally discovered as each of the plurality of high speed interconnects is calibrated based on a result of each of the plurality of high speed interconnects being calibrated.

9 Claims, 5 Drawing Sheets

(56) References Cited

U.S. PATENT DOCUMENTS

2004/0193706 A1 9/2004 Willoughby et al.
2008/0046705 A1 2/2008 Hirai et al.

OTHER PUBLICATIONS

U.S. Appl. No. 13/226,360, filed Sep. 6, 2011, Amann, Eberhard et al.
"U.S. Appl. No. 13/226,360 Office Action", May 14, 2014, 12 pages.

* cited by examiner

INTEGRATED LINK CALIBRATION AND MULTI-PROCESSOR TOPOLOGY DISCOVERY

RELATED APPLICATIONS

This application is a continuation application that claims the benefit under 35 U.S.C. §120 of U.S. patent application Ser. No. 13/226,360 filed Sep. 6, 2011.

BACKGROUND

Embodiments of the inventive subject matter generally relate to the field of computers, and, more particularly, to calibration of the links when the multiprocessor system is powered on.

Communication links or interconnects between microprocessors in a multi-processor system are designed to operate at high speeds. The communication links between the microprocessors can be unidirectional links and/or bi-directional links. When the multi-processor system is turned on, the multi-processor system calibrates the communication links in order to take advantage of the speed(s) of the communication links.

The calibration process is an automated training sequence that accounts for the electrical characteristics and trace length differences among the individual wires for each point-to-point between the processors in the multi-processor system. Typically, firmware of the multi-processor system implements and/or initiates the calibration process. After the calibration process is complete, the multi-processor system can use the communication links at full speed.

SUMMARY

Embodiments of the inventive subject matter include a method for integrating link calibration and dynamic topology discovery in a multi-processor system. The method establishes a first of a plurality of processors in a multi-processor system as a director of integrated link calibration and dynamic topology discovery. A plurality of high speed interconnects connects the plurality of processors with each other. The director processor directs calibration of each of the plurality of high speed interconnects via a shared hardware resource. The shared hardware resource is shared among the plurality of processors. Topology of the multi-processor system is incrementally discovered as each of the plurality of high speed interconnects is calibrated based on a result of each of the plurality of high speed interconnects being calibrated.

Embodiments of the inventive subject matter include a method for integrated high speed interconnect calibration and topology discovery in a multi-processor system. Processors of the multi-processor system are connected by a plurality of high speed interconnects. Calibration of each of the plurality of high speed interconnects is coordinated as directed by a first of the processors via a shared hardware resource. The shared hardware resource is shared among the processors. A result of attempted calibration of each of the plurality of high speed interconnects is written into the shared hardware resource. For each successfully calibrated one of the plurality of high speed interconnects, the corresponding result is used as information about topology of the multi-processor system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, the example illustrations depict a 4 processor system, but embodiments are not so limited. Embodiments can encompass any number of processors greater than 1. In other instances, well-known instruction instances, protocols, structures and techniques have not been shown in detail in order not to obfuscate the description.

Integrating link calibration with dynamic topology discovery in a multi-processor system allows for efficient initialization of a multi-processor system with the flexibility of dynamic topology discovery. For integrated link calibration and dynamic topology discovery, one of the processors in the multi-processor system directs the processors of the multi-processor system to calibrate each communication link ("link") between the processors. The directing processor directs the processors via a shared hardware resource. And the processors report results of the calibration via the shared hardware resource. The system leverages the calibration results as topology information. Hence, the multi-processor system dynamically discovers the topology as the processors calibrate the links. A multi-processor system can use low cost hardware for the shared hardware resource (e.g., shared memory accessible via a I2C bus). Utilizing one of the processors of the multi-processor system as a director and using low cost shared memory avoids the expense of including a co-processor or service processor for link calibration in the system. In addition, circuit board space is not consumed by the additional service processor. Integrated link calibration and dynamic topology discovery via shared memory also avoids elaborate topology discovery procedures that use additional hardware designed into each of the processors that constitute the multi-processor system, and avoids a calibration process hampered with starting in a low-speed/low link-width mode.

Figure 1:
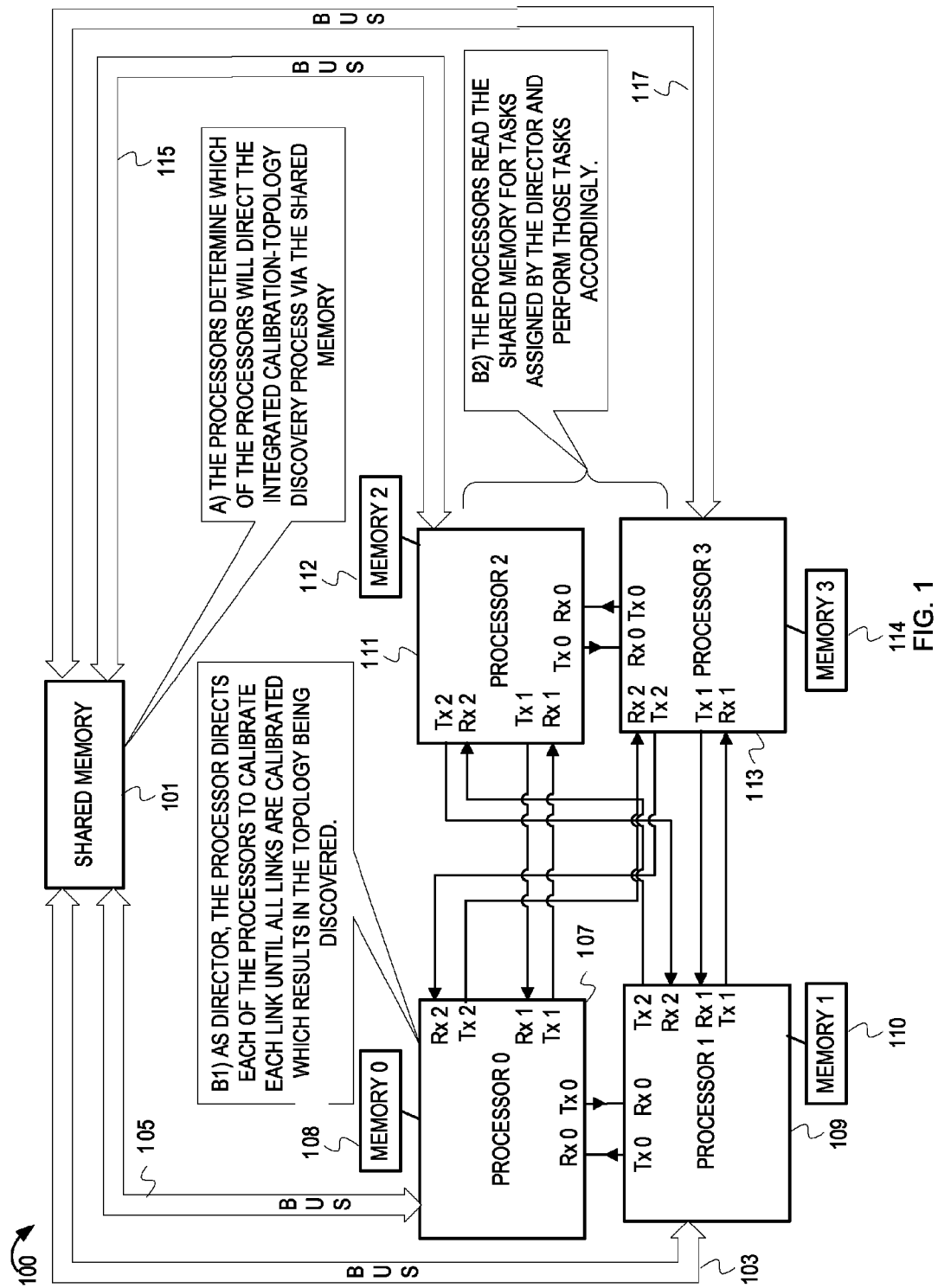
FIG. 1 depicts a conceptual diagram of integrated link calibration and dynamic topology discovery in a multi-processor system.

FIG. 1 depicts a conceptual diagram of integrated link calibration and dynamic topology discovery in a multi-processor system. In FIG. 1, a multi-processor system 100 includes a processor 0 (107), a processor 1 (109), a processor 2 (111), and a processor 3 (113). In some embodiments, the processors have built-in memory controllers. The example illustration of FIG. 1 reflects this case with depiction of each processor being directly coupled with memory. Processor 0 (107) is connected to memory 0 (108). Processor 1 (109) is connected to memory 1 (110). Processor 2 (111) is connected to memory 2(112). Processor 3(113) is connected to memory 3 (114). All of the processors are coupled with a shared memory 101. In some embodiments, the shared memory 101 resource is a flat-addressable random access memory ("RAM"). In other embodiments, the shared memory 101 is an Electrically Erasable Programmable Read Only Memory ("EEPROM"). Bus 103, bus 105, bus 115, and bus 117 connect the processors to the shared memory 101. Although a bus is an interconnect, the term "bus" is used herein to refer to an interconnect that connects a processor to shared memory for integrated link calibration and topology discovery in order to distinguish from an interconnect that connects processors to each other. The bus 103 connects the processor 1 (109) and the shared memory 101. The bus 105 connects the processor 0 (107) and the shared memory 101. The bus 115 connects the processor 2 (111) and the shared memory 101. The bus 117 connects the processor 3 (113) and the shared memory 101.

In FIG. 1, the processors are depicted as being connected with unidirectional links, even though embodiments can use bi-directional links, unidirectional links, or a combination of bi-directional and unidirectional links. Each of the processors 107, 109, 111, 113 comprises three receive (RX) and three transmit (TX) interfaces. On processor 0 (107), the interfaces are configured as follows: TX 0 and RX 0 are interfaces on the links that connect to the processor 1 (109), TX 1 and RX 1 are interfaces on the links that connect to the processor 2 (111), TX 2 and RX 2 are interfaces on the links that connect to the processor 3 (113). On processor 1 (109), the interfaces are configured as follows: TX 0 and RX 0 are interfaces on the links that connect to the processor 0 (107), TX 1 and RX 1 are interfaces on the links that connect to the processor 3 (113), TX 2 and RX 2 are interfaces on the links that connect to the processor 2 (111). On processor 2 (111), the interfaces are configured as follows: TX 0 and RX 0 are interfaces on the links that connect to the processor 3 (113), TX 1 and RX 1 are interfaces on the links that connect to the processor 1 (109), TX 2 and RX 2 are interfaces on the links that connect to the processor 0 (107). On processor 3 (113), the interfaces are configured as follows: TX 0 and RX 0 are interfaces on the links that connect to the processor 2 (111), TX 1 and RX 1 are interfaces on the links that connect to the processor 1 (109), TX 2 and RX 2 are interfaces on the links that connect to the processor 0 (107).

The example illustrated in FIG. 1 depicts operations that occur over three stages. The example indicates the stages as stages A, B1, and B2. The stages B1 and B2 encompass operations that overlap in time.

At stage A, the processors determine which of the processors will direct the integrated calibration-topology discovery process ("integrated process") via the shared memory 101. The processors 107, 109, 111, 113 execute instructions (e.g. firmware) on power up that leads to one of the processors assuming a role as a director for the integrated process. The processor that assumes the role of director communicates its identity to the other processors via the shared memory 101. For example, the directing processor writes its processor identifier into a reserved location in the shared memory 101. After the director is established, the director processor initializes the shared memory 101 for dispatching calibration-discovery tasks. For example, the director processor initializes the shared memory with one or more tables for the processors to read and write flags and/or values for the integrated process.

At stage B1, the director processor directs each of the processors, including itself, to calibrate each link until all links have been calibrated, or at least calibration has been attempted on all links. As each link is calibrated, results of the calibration are written into the shared memory, which results in the topology of the multi-processor system being discovered. In this example, we assume that the processor 0 (107) becomes the director for the integrated process. The processor 0 (107) records an indication into the shared memory 101 that the processor 0 (107) is the director. The processor 0 (107) then initializes the shared memory 101 for the integrated process. The processor 0 (107) begins dispatching calibration tasks to the processors 107, 109, 111, 113 by writing a value or values into the shared memory 101. The value or values indicate which processor should begin calibrating a link.

At stage B2, the processors read the shared memory 101 for tasks dispatched by the director processor 0 (107), and perform those tasks accordingly. As stated above, the director processor will operate in a dual role; the processor 0 (107) operates as a director and as a task performer. Thus, the processor 0 (107) reads the shared memory 101 along with the processors 109, 111, 113 for dispatched tasks. After a processor completes a task, the processor records a result into the shared memory 101. The director processor 0 (107) reads the result, and dispatches a next task for a next link to be calibrated. The processors carry out the integrated process via the shared memory to avoid the expense of an additional hardware, and the process of calibrating links in a low speed/low width mode. Once the integrated process completes, the multi-processor system uses the recorded results as topography information for the system.

Figure 2:
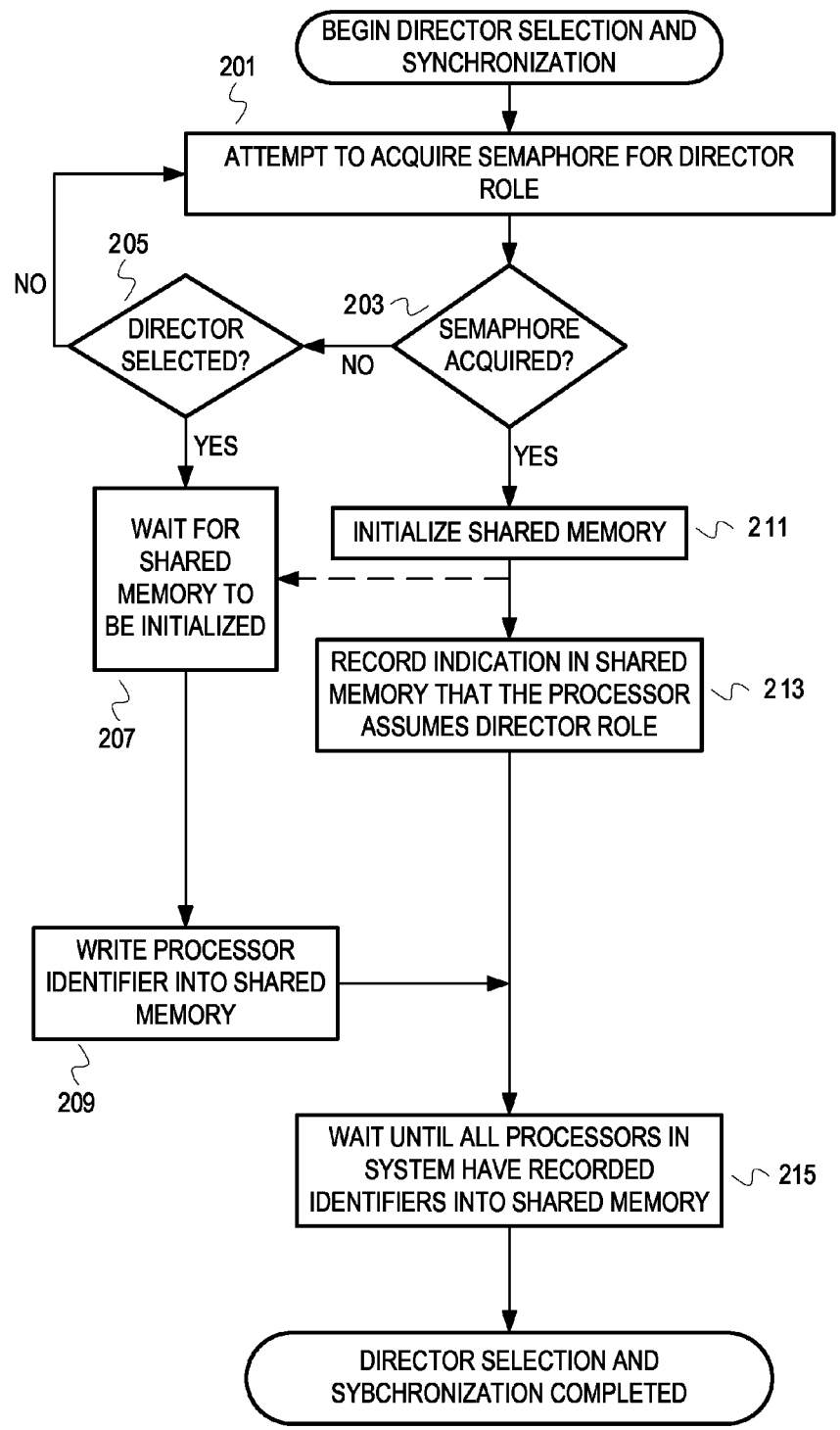
FIG. 2 illustrates a flow diagram of example operations for director selection and processor synchronization.

FIG. 2 illustrates a flow diagram of example operations for director selection and processor synchronization. At block 201, a processor attempts to acquire a semaphore for the director role. The processors of a multi-processor system execute the instructions to acquire the semaphore independently upon power up or after a reset. But only one of the processors will acquire the semaphore. Implementations of the semaphore acquisition can be in accordance with various techniques that control access to and use of a shared resource. Examples of techniques include Lamport's bakery algorithm, Djikstra's mutual exclusion algorithm, and Peterson's solution. In addition, embodiments initialize the shared resource to a known value throughout the shared resource (e.g., 0) upon power-up or reset.

At block 203, the processor determines whether the semaphore was acquired. If the semaphore was not acquired, then control flows to block 205. If the semaphore was acquired, then control flows to block 211.

At block 205, the processor determines whether a director was selected. The processor reads the shared memory to determine whether an indication has been written into the shared memory that identifies a director. Embodiments reserve a location in the shared memory for indication of the processor that becomes director. Other embodiments employ a special character to indicate a director has been selected. If a director has not been selected, then control returns to block 201 and the processor repeats the attempt to acquire the semaphore. If a director has been selected, then control flows to block 207. When a processor acquires the semaphore (i.e., becomes the director processor), the processor executes instructions that correspond to the duties of the director processor. This example illustration assumes an embodiment that embodies director functionality and non-director ("task performer") functionality in instructions (e.g., firmware) instantiated for each processor in a multi-processor system. As stated earlier, the processor that becomes the director processor for the integrated process will also execute task performer instructions.

At block 207, the processor waits for the shared memory to be initialized. Embodiments have a particular time period sufficient for initialization of the shared memory by the director processor programmed or configured into the integrated process instructions. In some embodiments, the non-director processors poll the shared memory until the shared memory reflects completion of initialization by the director. For example, the director processor can write a flag into the shared memory to indicate initialization is complete. As another example, the director processor can write information about a table(s) for the integrated process. When the non-director processor reads a table size or table header in the shared memory, then the non-director processor determines that the initialization of the shared memory is complete.

At block 209, the non-director processor writes its identifier into the shared memory. At this point, the director processor has initialized the shared memory with the data structure(s) for the integrated calibration-topology discovery process. The non-director processors write their identifiers into the shared memory for calibration task dispatch. For example, the director processor initializes the shared memory with a table comprising entries for each processor. The non-directors processors write their identifiers into those table entries. In some embodiments, the director processor segments the shared memory for the processors in the multi-processor system. The non-director processors write their identifiers into mutually exclusive segments to essentially take ownership of the segment. From block 209, control flows to block 215.

For a processor that acquires the semaphore and becomes director (block 203), the processor initializes the shared memory at block 211. The director processor instantiates one or more data structures in the shared memory for dispatching calibration tasks, recording results of the calibration tasks, and writing topography information based on the calibration results. Although any of a myriad of data structures can be employed, this description will simply refer to an "integrated process table" to avoid obfuscating the inventive subject matter with the various types of data structures that could be used and the number of data structures that could be used. In some embodiments, the director processor aligns each element of the integrated process table to the width of the storage instruction on the bus of the shared resource. This allows isolation and synchronization of updates in the integrated process table without locking/semaphores. After the shared memory is initialized, the director processor informs the waiting non-director processors as represented by the dashed line from 211 to block 207 (e.g., the director posts an indication that the initialization is complete, removes a block on the non-director processors, generates an event, etc.).

At block 213, the director processor records an indication in the shared memory that the processor assumes the director role. The processor writes its processor identifier into the reserved location in the shared memory for the director identifier. Embodiments do not necessarily reserve a particular location in the shared memory for recording an identifier of the director processor. In some embodiments, the first identifier written into the shared memory (e.g., at the lowest address, in a first table entry, etc.) corresponds to the director processor because non-director processors wait to write into the shared memory until the director completes initialization, which includes recording its identifier.

At block 215, the processor waits until all processors in the multi-processor system have recorded identifiers into the shared memory. Since the non-director processors do not proceed until a task is dispatched by the director processor, the director processor is essentially waiting on the non-director processors to write their identifiers into the shared memory. In some cases, a processor in a multi-processor system will fail or suffer from an error or defect that prevents reporting functionality and/or accessing the shared memory. Embodiments implement a grace period for all processors in the system to record their identifiers, thus reflecting an available status. In some cases, a processor has not failed but attempts to report after the grace period has expired. When the grace period expires, the director processor atomically marks the expiration of the grace period in the shared resources. Thus, a late processor will be aware that the initialization sequence has begun and will not interrupt it. Some embodiments tolerate a failed component and allow the integrated process to continue even if a processor is considered as failed or malfunctioning. Some embodiments stop the integrated process if the grace period expires and/or any of the processors in the multi-processor system report a problem. If failures are tolerated or no failures are detected, then the processor continues with the integrated process.

Figure 3:
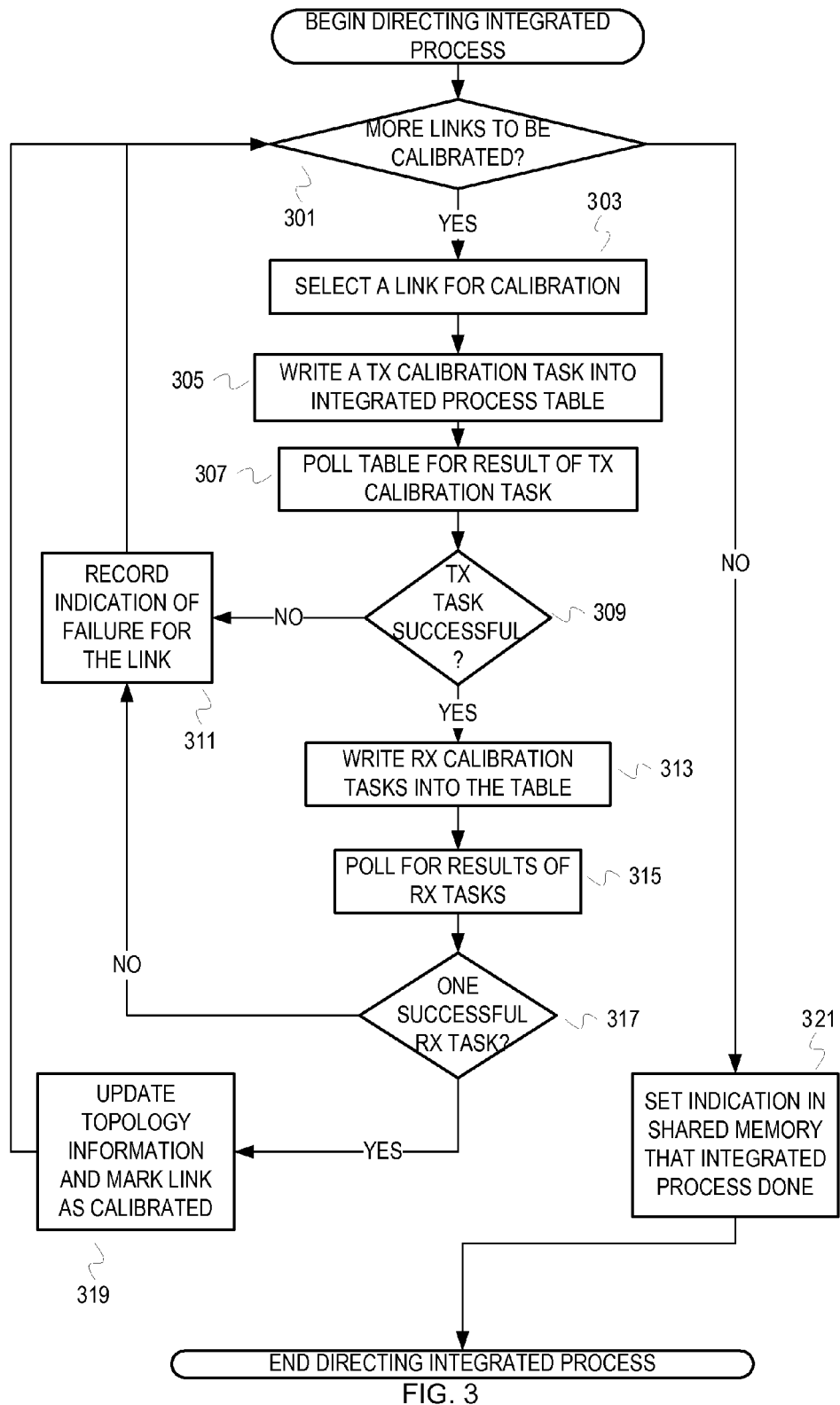
FIG. 3 depicts a flow diagram of example operations for directing an integrated calibration-topology discovery process.

FIG. 3 depicts a flow diagram of example operations for directing an integrated calibration-topology discovery process. At block 301, the director processor determines whether more links are to be calibrated. If there are more links to be calibrated then control flows to block 303. If there are no other links to be calibrated, then control flows to block 321. Initially none of the links are calibrated.

At block 303, the director processor selects a link for calibration. The director processor selects a processor indicated in a first entry in a task table, which could be the director processor itself, and a first TX interface (also referred to as port) for calibration. Table 1 illustrates an example logical table for tasks, tasks results, and topographical information in a multi-processor system with three processors.

TABLE 1

| | Logical Table in Shared Memory for Integrated Process | | | | | | | | | | | |
|---|---|---|---|---|---|---|---|---|---|---|---|---|
| | Processor 0 (107) | | | Processor 1 (109) | | | Processor 2 (111) | | | Processor 3 (113) | | |
| | 0 | 1 | 2 | 0 | 1 | 2 | 0 | 1 | 2 | 0 | 1 | 2 |
| TX | START | | | | | | | | | | | |
| RX | | | | | | | | | | | | |
| TOPO | (-1, 1) | (-1, -1) | (-1, -1) | (-1, -1) | (-1, -1) | (-1, -1) | (-1, -1) | (-1, -1) | (-1, -1) | (-1, -1) | (-1, -1) | (-1, -1) |

For this illustration, the director processor selects TX interface 0 of processor 0 (107) (107). Table 1 also shows (−1,−1) initial topography values for every entry. The (−1,−1) represents an example initialization value that indicates the topographic information has not been discovered yet. Embodiments can use any of a variety of initial values to show that the topography information is still unknown.

At block 305, the director processor writes a transmit ("TX") calibration task into an integrated process table. In Table 1, a value "START" in the entry for interface TX 0 on processor 0 (107) represents the TX calibration task. When processor 0 (107) reads the START value that represents the TX calibration task in the integrated process table, the processor 0 (107) will enable the interface TX 0 and start a calibration sequence on the interface TX 0. As with the other values depicted in these tables, the START is an example value to aid in understanding the inventive subject matter. Embodiments can use various values, examples of which include flags, symbols, binary values, strings, etc.

At block 307, the director processor polls the integrated process table for a result of the TX calibration task. Throughout the description, multiple references are made to polling. Embodiments can implement any one of the multiple polling techniques. For example, some embodiments implement busy waiting while other embodiments will conduct another task(s) after checking the state.

At block 309, the director processor determines whether the TX task was started successfully. When a processor indicates that a TX task was started successfully, the processor is indicating that the interface reports it is now sending calibration patterns. But starting the transmission successfully does not indicate a fully initializes link. The director processor reads the table to determine whether the START has been replaced with a value that indicates successful start of training data transmission over the interface TX 0 on the processor 0 (107). The processor 0 (107) may have encountered a problem with the interface TX 0, and written an error code into the entry for TX 0 on processor 0 (107). If the TX task was started successfully, then control flows to block 313. If not, then control flows to block 311.

with "RX" in all entries for all interfaces on all processors, except for interface RX 0 on processor 0 (107); it is assumed that the link will not connect back to itself on the same processor. Some embodiments will not dispatch the RX calibration task to any RX interface on the same processor that performed the TX calibration task, but a variety of topographies are possible.

At block 315, the director processor polls the table for results of the RX calibration tasks. The director processor polls the table until the RX task indications have been replaced with either an indication of an error or success.

At block 317, the director processor determines whether one successful RX calibration task was completed successfully. The director processor reads through the integrated process table to determine if one entry reflects a successful receive of the calibration sequence sent from TX 0 on the processor 0 (107). If none of the RX calibration results indicate a successful receive of the calibration sequence, then control flows to block 311; the link for TX 0 is considered as failed. If there is a successful RX calibration result, then control flows to block 319.

At block 319, the director processor updates topology information and marks the link as calibrated. Table 3 represents an example of data written into the table that reflects an update to the topography information and marking of the link as calibrated.

TABLE 3

| Logical Integrated Process Table with RX Calibration Task Results and Topography Information | | | | | | | | | | | | |
|---|---|---|---|---|---|---|---|---|---|---|---|---|
| Processor 0 (107) | | | Processor 1 (109) | | | Processor 2 (111) | | | Processor 3 (113) | | | |
| | 0 | 1 | 0 | 1 | 2 | 2 | 0 | 1 | 2 | 0 | 1 | 2 |
| TX | TX_OK | | | | | | | | | | | |
| RX | | RXerr | RXerr | RX_OK | RXerr | RXerr | RXerr | RXerr | RXerr | RXerr | RXerr | RXerr |
| TOPO | (−1, 1) | (−1, −1) | (−1, −1) | (0, 0) | (−1, −1) | (−1, −1) | (−1, −1) | (−1, −1) | (−1, −1) | (−1, −1) | (−1, −1) | (−1, −1) |

At block 311, an indication of failure is recorded for the interface TX 0 on the processor 0 (107). Embodiments handle failures on interfaces differently. Some embodiments will configure the initialization sequence to tolerate some degree of failed components, and continue with the integrated process until a number of components beyond a threshold fail. Some embodiments perform additional operations, such as logging the errors in a system log or retrying calibration on failed links a given number of times. Control flows from block 311 back to block 301.

At block 313, the director processor writes receive ("RX") calibration tasks into the integrated process table. The director processor writes RX calibration tasks into the table for all processors in this example. Table 2 reflects this dispatch of RX calibration tasks for all processors.

After the RX calibration tasks were performed, the processors wrote the results into the table. Each processor that did not receive the calibration sequence records some value that indicates an error, which is represented with "RXerr" in table 3. The processor 1 (109) received the calibration sequence on interface RX 0, as reflected by "RX_OK" in table 3. Based on the successful receipt of the calibration sequence from the TX 0 interface on processor 0 (107) by the RX 0 interface on processor 1 (109), the director processor can determine that the link connects TX 0 of processor 0 (107) to RX 0 of processor 1 (109). The director processor writes a value that reflects this topographic information. In table 3, the topographic information is represented by (0, 0) in the entry for RX 0 on processor 1 (109). The (0, 0) indicates that RX 0 on

TABLE 2

| Logical Integrated Process Table with RX Calibration Tasks | | | | | | | | | | | | |
|---|---|---|---|---|---|---|---|---|---|---|---|---|
| Processor 0 (107) | | | Processor 1 (109) | | | Processor 2 (111) | | | Processor 3 (113) | | | |
| | 0 | 1 | 2 | 0 | 1 | 2 | 0 | 1 | 2 | 0 | 1 | 2 |
| TX | TX_OK | | | | | | | | | | | |
| RX | | RX | RX | RX | RX | RX | RX | RX | RX | RX | RX | RX |
| TOPO | (−1, 1) | (−1, −1) | (−1, −1) | (−1, −1) | (−1, −1) | (−1, −1) | (−1, −1) | (−1, −1) | (−1, −1) | (−1, −1) | (−1, −1) | (−1, −1) |

Table 2 reflects an indication of the successful TX calibration task with "TX_OK" and dispatch of the RX calibration tasks processor 1 (109) connects to the processor 0 (107) via interface 0. The change of the initialization value (−1,−1) also serves as an indication that the link has been calibrated. Embodiments can write a special value for links that have failed calibration so the director processor is aware that calibration has been attempted. For example, the (−1,−1) can be replaced with a fail flag. Control flows from block 319 back to block 301.

If the director processor determines at block 301 that no more links are to be calibrated, then control flows to block 321. At block 321, the director processor sets an indication in the shared memory that the integrated calibration-topology discovery process is done. Processors will discontinue polling when the done indication is detected.

Figure 4:
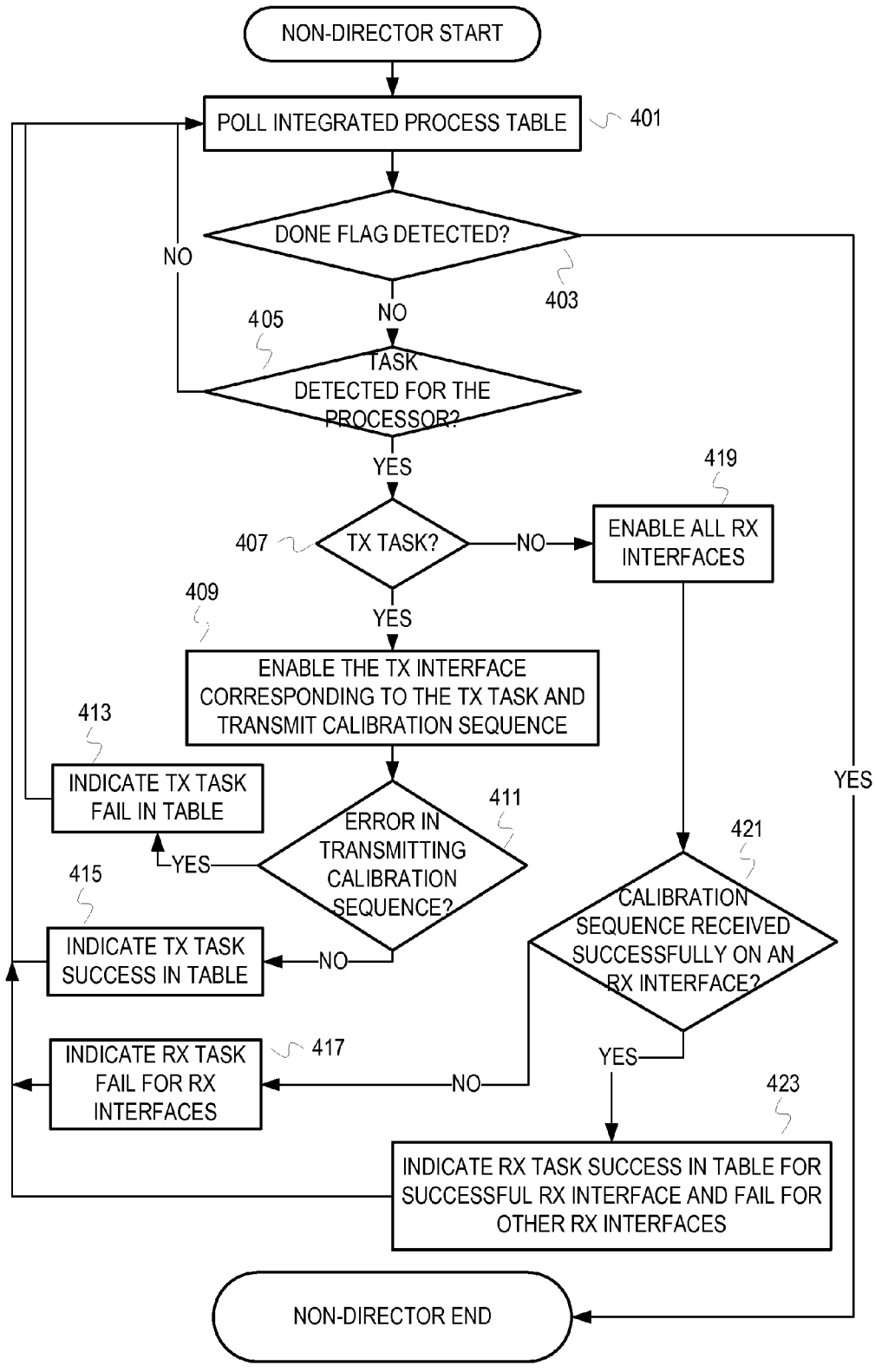
FIG. 4 depicts a flow diagram of example operations for performing calibration tasks dispatched by a director processor.

FIG. 4 depicts a flow diagram of example operations for performing calibration tasks dispatched by a director processor. At block 401, a processor polls the integrated process table. The processor polls the table to detect either a done flag or a task written into a location that corresponds to the processor. Some embodiments indicate the subject processor in the task indication.

At block 403, the processor determines whether a done flag has been set by the director processor. The done flag indicates that the integrated calibration-topology discovery process has been completed. If the processor detects the done flag, then the processor stops polling the table and stops executing the instructions for the integrated process. If the done flag is not detected, then control flows to block 405.

At block 405, the processor determines whether a task has been written into the table for the processor. If the processor detects a task in the processor's entry or a task that indicates the processor, then control flows to block 407. If no task is detected for the processor, then control returns to block 401. In some embodiments, an operation corresponding to block 405 is not performed. Some embodiments will poll for any change to the integrated process table, and then determine whether the change affects the processor. Other embodiments poll locations within the shared memory and/or the integrated table that correspond to the processor. Thus, the polling continues until the done flag is detected or a task for the processor is detected, instead of merely detecting any task.

At block 407, the processor determines whether the task is a TX calibration task or RX calibration task. If the task is a TX calibration task, then control flows to block 409. If the task is a RX calibration task, then control flows to block 419.

At block 409, the processor enables the TX interface that corresponds to the TX task. The processor determines which interface corresponds to the entry hosting the TX calibration task indication, and enables that TX interface. After the TX interface is enabled, the processor begins transmitting a calibration sequence over the TX interface.

At block 411, the processor determines whether an error occurs in transmitting the calibration sequence. If an error occurs, then control flows to block 413. If the calibration sequence transmission begins without error, then control flows to block 415.

At block 413, the processor indicates a fail result for the TX calibration task in the integrated process table. Control flows from block 413 back to block 401.

At block 415, the processor indicates a successful result for the TX calibration task in the integrated process table. After recording the successful result, the processor continues transmitting the calibration patterns until the director processor indicates that the transmitting should stop. Control flows from block 413 back to block 401.

If the detected task was a RX calibration task (407), then the processor enables all RX interfaces at block 419. The director processor writes an indication of RX task calibration for a processor. The processor detects the RX task calibration, and enables all RX interfaces that have not already been calibrated. The processor reads the integrated process table to determine the RX interfaces that have already been successfully calibrated. In some embodiments, the director processor writes the RX task calibration for individual interfaces. Thus, the task performing processor enables the RX interface that corresponds to each RX task.

At block 421, the processor determines whether a calibration sequence is successfully received on one of the RX interfaces. If a calibration sequence is not successfully received on one of the enabled RX interfaces, then control flows to block 417. If a calibration sequence is received on one of the enabled RX interfaces, then control flows to block 423.

At block 417, the processor indicates that the RX task failed for the enabled RX interfaces. As indicated in the Table 3 above, the processor will write a fail value represented by "RXerr" in table 3. Control flows from block 417 back to block 401.

At block 423, the processor indicates a successful RX calibration task result for the interface that successfully receives the sequence. The processor indicates a fail result for the other enabled RX interfaces. Control flows from block 417 back to block 401.

It should be understood that that the flow diagrams are provided as examples to aid in understanding the inventive subject matter, and should not be used to limit embodiments or the scope of the claims. Embodiments can perform additional operations, fewer operations, different operations, the operations in a different order, the operation in parallel, etc. For example, embodiments can perform the RX calibration tasks before the TX calibration tasks. As another example, the director processor performs operations to instruct processors to stop transmitting. In some embodiments, the director processor records an indication (e.g., a value representing TX STOP) in the shared resource before or after the operations represented at blocks 311 and 319. In some embodiments, the transmitting processor also polls the integrated process table for RX result indications. And when the processor reads a result of the RX calibration task, the processor stops transmitting training data.

As will be appreciated by one skilled in the art, aspects of the present inventive subject matter may be embodied as a system, method or computer program product. Accordingly, aspects of the present inventive subject matter may take the form of an entirely hardware embodiment, an software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
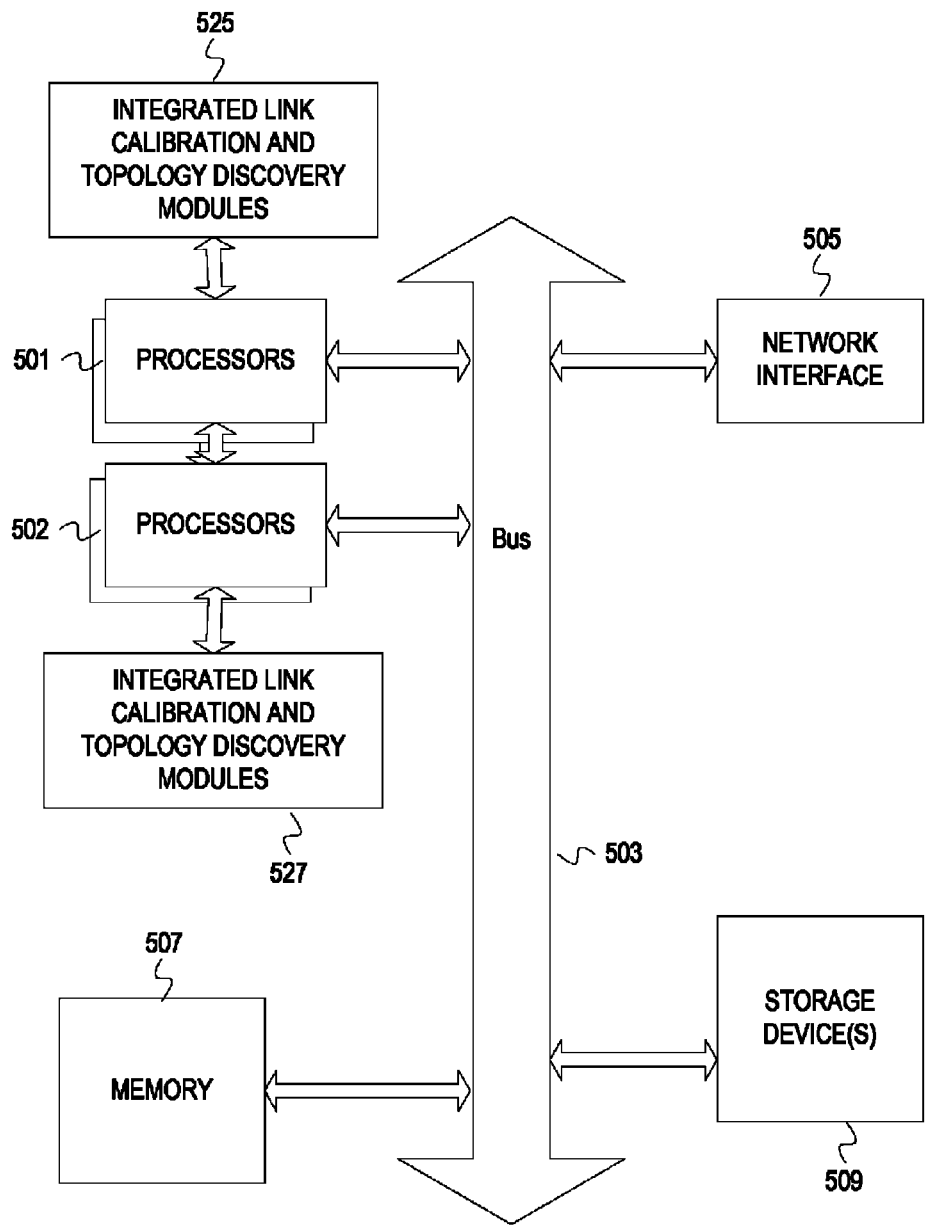
FIG. 5 depicts an example computer system.

FIG. 5 depicts an example computer system. A multi-processor computer system includes multiple processors 501, 502 (possibly including multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express bus, HyperTransport® bus, InfiniBand® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The multiple processors 501, 502 are connected with high-speed/high bandwidth interconnects (e.g., elastic interface buses). The processors 501, 502 are also coupled with respective ones of integrated link calibration and topology discovery modules 525, 527. The modules 525, 527 embody instructions that implement the functionality for the integrated link calibration-topology discovery described above. Further, realizations may include fewer or additional components not illustrated in FIG. 5 (e.g., video cards, audio cards, additional network interfaces, peripheral devices, etc.). The processors 501, 502; the storage device(s) 509; and the network interface 505 are coupled to the bus 503.

While the embodiments are described with reference to various implementations and exploitations, it will be understood that these embodiments are illustrative and that the scope of the inventive subject matter is not limited to them. In general, techniques for integrated link calibration and dynamic topology discovery in a multi-processor system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   establishing a first of a plurality of processors in a multi-processor system as a director of integrated interconnect calibration and dynamic topology discovery, wherein a plurality of high speed interconnects connects the plurality of processors with each other;
   calibrating each of the plurality of high speed interconnects as directed by the director via a shared hardware resource, wherein the shared hardware resource is shared among the plurality of processors; and incrementally discovering topology of the multi-processor system as each of the plurality of high speed interconnects is calibrated and based, at least in part, on results of the plurality of high speed interconnects being calibrated.

2. The method of claim 1 further comprising initializing, by the director, the shared hardware resource with at least one data structure to host indications of the plurality of processors, indications of the topology of the multi-processor system, results of said calibrating each of the plurality of high speed interconnects, and indications of tasks dispatched by the director for directing said calibrating each of the plurality of high speed interconnects.

3. The method of claim 2, wherein said initializing the shared hardware resource further comprises recording an identifier of the first processor to indicate that the first processor has been established as the director.

4. The method of claim 1 further comprising the other ones of the plurality of processors writing their identifiers into the shared hardware resource.

5. The method of claim 1, wherein said calibrating each of the plurality of high speed interconnects as directed by the director via the shared hardware resources comprises:
the director writing a calibration task indication into the shared hardware resource for a second of the plurality of processors;
the second of the plurality of processors reading the calibration task indication; and
the second of the plurality of processors initiating calibration of a first of the plurality of high speed interconnects, which is coupled to the second of the plurality of processors, responsive to said reading the calibration task indication.

6. The method of claim 5 further comprising:
the director determining that the second of the plurality of processors has successfully initiated the calibration of the first high speed interconnect;
the director writing into the shared hardware resource a plurality of receive calibration task indications for uncalibrated ones of the plurality of high speed interconnects of other ones of the plurality of processors responsive to said determining that the second of the plurality of processors has successfully initiated the calibration of the first high speed interconnect;
the other ones of the plurality of processors, which are not the first and the second of the plurality of processors, reading the plurality of receive calibration task indications; and
the other ones of the plurality of processors initiating receive calibration on the uncalibrated ones of the plurality of high speed interconnects responsive to said reading the plurality of receive calibration task indications.

7. The method of claim 1, wherein said incrementally discovering topology of the multi-processor system as each of the plurality of high speed interconnects is calibrated based on the result of each of the plurality of high speed interconnects being calibrated comprises:
recording an indication of the result for each attempted calibration of the plurality of high speed interconnects, wherein each of the indications corresponding to a successfully calibrated one of the plurality of high speed interconnects indicates the processors of the plurality of processors connected by the successfully calibrated high speed interconnect.

8. A method for integrated high speed interconnect calibration and topology discovery in a multi-processor system, wherein processors of the multi-processor system are connected by a plurality of high speed interconnects, the method comprising:
coordinating calibration of each of the plurality of high speed interconnects as directed by a first of the processors via a shared hardware resource, wherein the shared hardware resource is shared among the processors;
writing a result of attempted calibration of each of the plurality of high speed interconnects into the shared hardware resource; and
for each successfully calibrated one of the plurality of high speed interconnects, using the corresponding result as information about topology of the multi-processor system.

9. The method of claim 8 further comprising establishing the first of the processors as a director, wherein the director writes tasks into the shared hardware resource and reads results in the shared hardware resource for said coordinating the calibration of each of the plurality of high speed interconnects.

* * * * *